US010706124B2

(12) United States Patent
Akselrod et al.

(10) Patent No.: US 10,706,124 B2
(45) Date of Patent: Jul. 7, 2020

(54) STORAGE AND RETRIEVAL OF STRUCTURED CONTENT IN UNSTRUCTURED USER-EDITABLE CONTENT STORES

(71) Applicant: Microsoft Technology Licensing, LLC, Redmond, WA (US)

(72) Inventors: Gregory Bernard Akselrod, Seattle, WA (US); Daniel Robert Amirault, Seattle, WA (US); Eun Ju Nam, Redmond, WA (US); Gareth Alun Jones, Issaquah, WA (US); Nicholas Jordan Barnwell, Mercer Island, WA (US); Allison Gallant, Kirkland, WA (US); Ignacio Omar Venado Estrada, Seattle, WA (US); William Joseph Bishop, Mill Creek, WA (US); Bharathwaj Raam Sampathkumar, Bothell, WA (US); Koushik Bhattacharjee, Redmond, WA (US); Scott Kurtzeborn, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1150 days.

(21) Appl. No.: 14/594,631

(22) Filed: Jan. 12, 2015

(65) Prior Publication Data
US 2016/0203233 A1 Jul. 14, 2016

(51) Int. Cl.
*G06F 16/958* (2019.01)
*G06F 16/93* (2019.01)
*G06F 16/31* (2019.01)

(52) U.S. Cl.
CPC ............ *G06F 16/986* (2019.01); *G06F 16/31* (2019.01); *G06F 16/93* (2019.01)

(58) Field of Classification Search
CPC .......... G06F 17/21; G06F 16/31; G06F 16/93; G06F 17/218
See application file for complete search history.

(56) References Cited

U.S. PATENT DOCUMENTS

| 7,197,503 B2 | 3/2007 | Palanisamy et al. |
| 7,251,777 B1 * | 7/2007 | Valtchev ............... G06F 17/211 707/999.006 |

(Continued)

FOREIGN PATENT DOCUMENTS

| CN | 102081645 A | 6/2011 |
| WO | 2006001641 A1 | 1/2006 |

OTHER PUBLICATIONS

"International Search Report and Written Opinion Issued in PCT Application No. PCT/US2016/012401", dated Mar. 24, 2016, 10 Pages.

(Continued)

*Primary Examiner* — Charles E Lu
(74) *Attorney, Agent, or Firm* — Talem IP Law, LLP

(57) ABSTRACT

Systems and techniques are disclosed for enabling structured data to be associated with visual content in a manner that preserves the ability to edit the visual content using a content application such as a notebook application. Techniques and systems enable semantic notation to be introduced into selected regions of the visual content that indicate the visual content's structured data, allowing the content to be searched and accessed more easily by common search technologies and search engines. The semantic notation is assigned to the visual content so that the introduction of the semantic notation does not hinder the user's viewing or editing of the visual content with a content application. The inclusion of the semantic notation does not cause existing (Continued)

visual editing tools that do not understand the semantic notation to cease to function properly.

17 Claims, 9 Drawing Sheets

(56) References Cited

U.S. PATENT DOCUMENTS

| | | | |
|---|---|---|---|
| 8,096,477 B2 | 1/2012 | Brown et al. | |
| 8,639,719 B2 | 1/2014 | Fisher et al. | |
| 8,688,694 B2 | 4/2014 | Dexter | |
| 2003/0237048 A1* | 12/2003 | Jones | G06F 17/218 715/234 |
| 2004/0181746 A1* | 9/2004 | McLure | G06F 17/2247 715/233 |
| 2005/0108630 A1* | 5/2005 | Wasson | G06F 17/241 715/230 |
| 2007/0112844 A1 | 5/2007 | Tribble et al. | |
| 2007/0168948 A1* | 7/2007 | Goland | G06F 8/33 717/113 |
| 2007/0266011 A1 | 11/2007 | Rohrs et al. | |
| 2007/0266342 A1 | 11/2007 | Chang et al. | |
| 2009/0216715 A1* | 8/2009 | Dexter | G06F 17/241 |
| 2013/0222610 A1* | 8/2013 | Brahms | G06F 3/03545 348/207.1 |

OTHER PUBLICATIONS

"International Preliminary Report on Patentability Issued in PCT Application No. PCT/US2016/012401", dated Mar. 24, 2017, 7 Pages.

"Second Written Opinion Issued in PCT Application No. PCT/US2016/012401", dated Dec. 19, 2016, 6 Pages.

Dontcheva, et al., "Relations, Cards, and Search Templates: User-Guided Web Data Integration and Layout", In Proceedings of the 20th annual ACM symposium on User interface software and technology, Oct. 7, 2007, 10 pages.

Jadhao, et al., "Semantic Tool for Analysing Unstructured Data", In International Journal of Scientific & Engineering Research, vol. 3, Issue 8, Aug. 2012, 7 pages.

Pham, et al., "Clui: A Platform for Handles to Rich Objects", In Proceedings of the 25th annual ACM symposium on User interface software and technology, Oct. 7, 2012, 12 pages.

Chitra, et al., "Unstructured Data into Intelligent Information Analysis and Evaluation", In Proceedings of International Conference on Global Innovations In Computing Technology, vol. 2, Special Issue 1, Mar. 2014, pp. 1925-1933.

"First Office Action and Search Report Issued in Chinese Patent Application No. 201680005537.4", dated Mar. 9, 2020, 16 Pages.

\* cited by examiner

```
261  <div itemscope itemtype="http://schema.org/Recipe">
     ...
262    <b><u><span itemprop="name">Cake</span></u></b>
     ...
263      <ul>Ingredients
264           <li itemprop="ingredients">Flour</li>
265           <li itemprop="ingredients">Brown Sugar</li>
266           <li itemprop="ingredients">Eggs</li>
267      </ul>
     ...
268  </div>
```

FIG. 2C

```
261  <div itemscope itemtype="http://schema.org/Recipe">
     ...
262    <b><u><span itemprop="name">Cake</span></u></b>
     ...
263      <ul>Ingredients
264           <li itemprop="ingredients">Flour</li>
265           <li itemprop="ingredients">Brown Sugar</li>
266           <li itemprop="ingredients">Eggs</li>
270           <li itemprop="ingredients">Cinnamon</li>
267      </ul>
     ...
268  </div>
```

FIG. 2D

```
351.  <div itemscope itemtype="http://schema.org/Recipe">
      ...
352.    <b><u><span itemprop="name">Cake</span></u></b>
      ...
353.        <ul>Ingredients
354.          <li itemprop="ingredients">Flour</li>
355.          <li itemprop="ingredients">Sugar</li>
356.          <li itemprop="ingredients">Eggs</li>
357.        </ul>
      ...
358  </div>
```

```
        <div itemscope itemtype="http://schema.org/Recipe">
        ...
          <b><u><span itemprop="name">Cake</span></u></b>
        ...
            <ul>Ingredients
360           <li itemprop="ingredients">Flour</li>
361           <li itemprop="ingredients">Brown Sugar</li>
              <li itemprop="ingredients">Eggs</li>
            </ul>
        ...
        </div>
```

STORAGE AND RETRIEVAL OF STRUCTURED CONTENT IN UNSTRUCTURED USER-EDITABLE CONTENT STORES

BACKGROUND

"Structured data" refers to information that is organized according to a pre-defined data model. Often, structured data is stored in databases such as relational databases. Even though many websites are generated dynamically from structured data, when this data is formatted into HTML, the data becomes unstructured. Furthermore, users often want to save content they have copied from Internet web sites or other sources into "notebook" applications such as Microsoft OneNote® and Evernote®. In the process of copying content, much of the semantic structure of the content can be lost.

BRIEF SUMMARY

Systems and techniques are disclosed for enabling structured data to be associated with visual content in a manner that preserves the ability to edit the visual content using a content application such as a notebook application. Techniques and systems enable semantic notation to be introduced into selected regions of the visual content that indicate the visual content's structured data, allowing the content to be searched and accessed more easily by common search technologies and search engines, as well as allowing queries, joins, and other familiar data management techniques to be applied to formerly unstructured content.

Furthermore, the semantic notation is assigned to the visual content so that the introduction of the semantic notation does not hinder the user's viewing or editing of the visual content with a content application. Advantageously, the inclusion of the semantic notation does not cause existing visual editing tools that do not understand the semantic notation to cease to function properly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2C-2D show examples of storing markup language.

DETAILED DESCRIPTION

Figure 1:
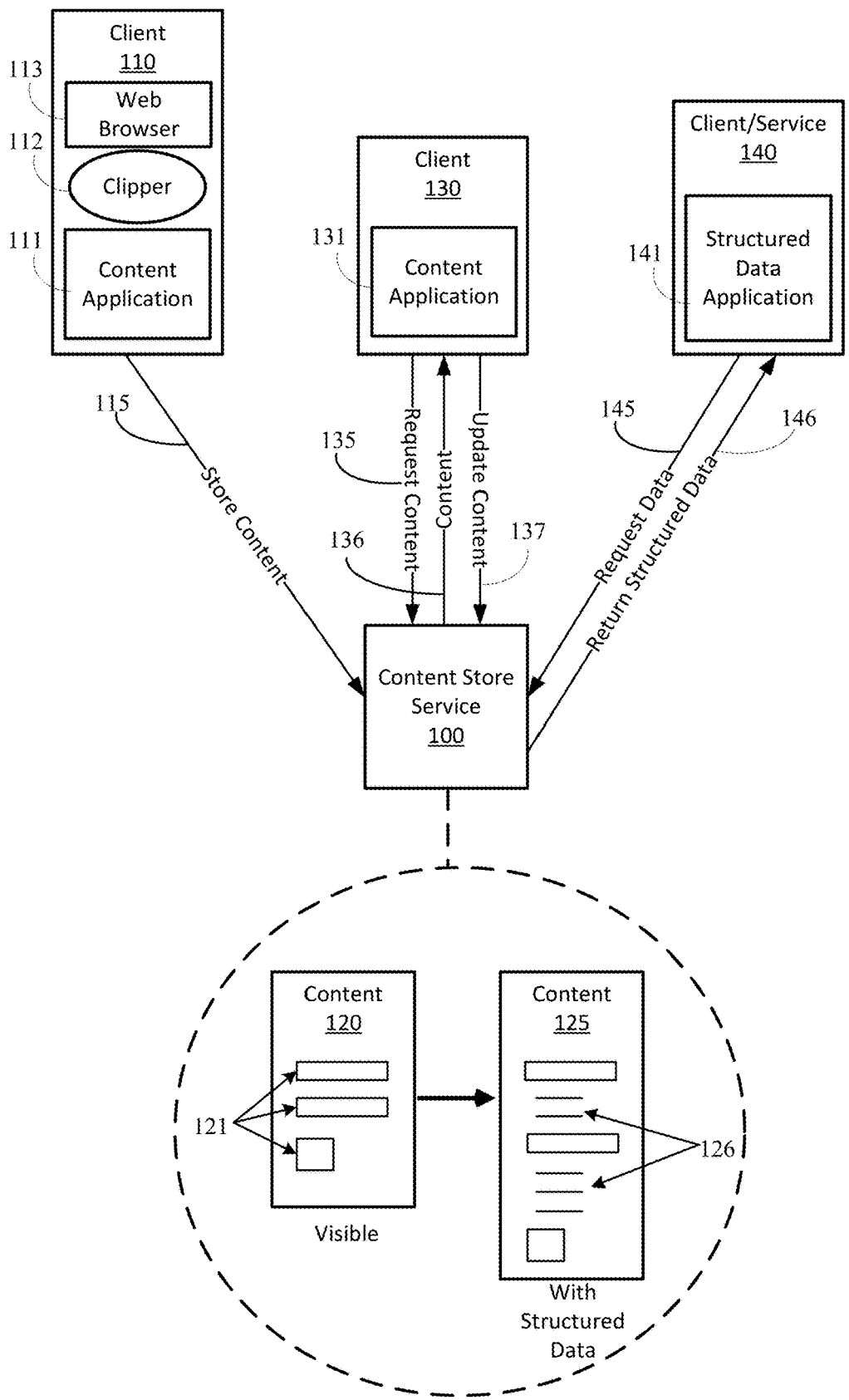
FIG. 1 illustrates an example operating environment in which certain implementations of systems and techniques for structured content storage and retrieval may be carried out.

Systems and techniques are disclosed for enabling structured data to be associated with visual content in a manner that preserves the ability to edit the visual content using a content application such as a notebook application.

The disclosed techniques and systems provide technical features that result in several technical benefits. Certain techniques and systems enable semantic notation to be introduced into selected regions of the visual content that indicate the visual content's structured data. The addition of structured data to visual content allows the content to be searched and accessed more easily by common search technologies and search engines, as well as allowing queries, joins, and other familiar data management techniques to be applied to formerly unstructured content.

Furthermore, the semantic notation is assigned to the visual content so that the introduction of the semantic notation does not hinder the user's viewing or editing of the visual content with a content application. Advantageously, the inclusion of the semantic notation does not cause existing visual editing tools that do not understand the semantic notation to cease to function properly. Thus, techniques and systems can transform an existing content store into a hybrid content store that has malleable visual content and structured data aspects, without requiring viewing and editing mechanisms in existing software to be revised.

An example scenario involving a cooking recipe on a website may be illustrative. Here, a user wants to save a recipe for later by storing the recipe in a notebook application such as Microsoft OneNote®. The user selects the visual content (e.g., text and photos) from the webpage using the cursor or a web clipper, copies the visual content, and pastes or saves the visual content into the notebook application. In some cases, any semantic structure contained in the content would be lost when the content was pasted into the notebook application; all that may remain is the visual formatting of the text.

However, using the techniques and systems described herein, the semantic structure of the copied content may be preserved, modified, and/or enhanced. For example, in a typical recipe, the information is organized into "ingredients" and "steps." Using the described techniques and systems, the ingredients and steps may receive invisible annotations that indicate the individual ingredients and steps as structured data elements. Later editing of the recipe (or other content) would preserve the structured data, since the semantic notation would not disrupt, disturb, or otherwise be visible to the visual editing process performed by the user. With semantic notation in place, the content can then be used and manipulated in additional ways. For example, the list of ingredients and amounts could be retrieved by a shopping list application that would calculate the types and amounts of ingredients to purchase during a weekly shopping trip for a week of recipes.

Certain implementations include a content store service capable of receiving visual content, determining the structured data related to the visual content, and associating semantic notation indicative of structured data to the visual content. Some implementations include an application programming interface for enhancing access to the structured data in a content store.

FIG. 1 illustrates an example operating environment in which certain implementations of systems and techniques for structured content storage and retrieval may be carried out. In FIG. 1, content store service 100 can implement techniques for applying semantic notation to content stores and retrieving structured data from content stores, as described with respect to the process flow in FIGS. 2A, 3A, and 4.

Content enters the content store service 100 in some cases via a client 110. Client 110 may include a content application 111 that allows for the viewing, storing, editing, or authoring of visual content. An example content application 111 is a notebook application that assists the user in storing content created and gathered from various sources. Examples of notebook applications include Microsoft OneNote® and Evernote®.

In some implementations, the content application 111 stores the content in one or more content stores in a cloud service repository associated with the user. Content store service 100 may be a component of the cloud service. In some cases, a content store may be stored locally on the client 110. If the content store is local to the client, the content store service 100 may be localized on the client. Furthermore, a content store may be stored primarily in the cloud, but have a local copy of the content store on the client 110 for offline accessibility; various processes may synchronize the cloud copy and the local copy.

Some content applications are capable of working with a wide variety of types of visual content. "Visual content," as used herein, refers to, for example, text, images, embedded binary files, multimedia files, attached documents, and handwritten ink strokes that may be displayed within a content application. Visual content can include the formatting, style, layout, and other visible presentation aspects describing the various individual items of content and their relationship to one another. Visual content is sometimes described using a formatting language that both embodies the information (e.g., the "words" in the case of text) and controls how the information is displayed (e.g., that the words in the text are bold, 12-point Times New Roman font). A content application then renders the content on the display to the user in the manner the formatting language describes. Examples of formatting languages are Hypertext Markup Language (HTML) and Rich Text Formatting (RTF) language.

Sometimes visual content is a segment of content that enters a content application as a result of being copy/pasted, clipped, or otherwise recorded from another content source. For instance, a user may want to copy a region of the visual content of a web page being displayed in a browser, as for example when a user wants to copy/paste or web-clip a cooking recipe into notebook application for later use. When a selection of content is "clipped" from a web page, the destination content application receiving the clipped content determines whether to use only the information (raw text and/or images) or the information plus the formatting descriptions.

Sometimes, perhaps if the destination content application uses HTML natively, the destination content application may paste the HTML into the rendering application as-is. In other cases, the destination content application tries to display the content as faithfully to the original rendering as possible, but instead converts the visual content's formatting language commands into a different type of formatting language before rendering. In still other cases, only the information aspect, i.e., the plain visible text without formatting, is captured and/or rendered by the destination content application.

A clipper 112 may be available at the client 110. A clipper 112 is locally running application that can be used to collect and capture content for a user. Through the clipper 112, a user can select to clip the whole page, extracted portions of the whole page, one or more regions of the page and/or a recognized object on the page, such as an image. The clipper 112 may be a web clipper, a clipping tool running on an operating system, an application having a clipping feature, or a feature of a content application, as some examples. The clipper 112 may or may not be directly associated with a destination application for the content.

A web clipper typically clips content from a website and inserts the content into a content application 111 (e.g., a notebook application) or other application to which the clipper is associated. Web clippers generally run on a web browser at a client 110. The web clipper may be implemented in JavaScript, as an example, and can be interoperable (and in some cases integrated) with the web browser. Because each web browser has different capabilities, web clippers may be configured based on the web browser. In some cases, the clipper 112 is included as an add-on, plug-in, or bookmarklet for a web browser to clip content rendered in the web browser. In some cases the clipper is included as a feature of the operating system (not shown) to capture any content being rendered on a display (similar to a print screen function). In some cases, the clipper can be included as a web function or add-on of a content application 111.

Content can be sent to a user's notebook or other content application 111 through the clipper 112. The content application may communicate with content store service 100 to store content 115, and the content store service 100 may enact semantic notation for structured data associated with the content.

A "content store" refers to a storage structure that contains any or all of visual content, formatting instructions, and other semantic or structured data elements. A content store may be, for example, a file, such as an HTML file or word processing file, a logical division inside a file that contains multiple content stores, and/or a set of database records stored in a relational database management system.

A content store can include one or more "content containers" that are arranged in a graph structure. In the context of content stores, a graph structure refers to a hierarchical (or "tree") arrangement that allows some containers or elements to be nested within higher level containers or elements. Thus, a content store arranged in a graph structure contains one or more content containers that are arranged hierarchically. In HTML, for example, a content container may be denoted by matching open and close tag pairs, such as the "<div> </div>" tag pair. When a "<div>" tag pair encloses other tag pairs, the "<div>" tag pair is a parent container of any tag pairs that are enclosed by it.

A content container can have any, all, or none of an information aspect, a formatting aspect, and a structured data aspect. A content container's information aspect and formatting aspect are included in the content container's visual aspect, and are part of what is normally considered the "visual content," as these aspects are visible to a user. In HTML, for example, a content container might have the element "<b>Cake Recipe</b>". This content container includes both the information aspect ("Cake Recipe") and the formatting aspect (the result of the "<b>" and "</b>" tags surrounding the information) that denote the words "Cake Recipe" should be displayed in bold typeface when viewed. As noted, content containers may be hierarchically arranged, as when the content containers "flour" and "sugar" are child containers of a parent content container "ingredients" that describes a list of ingredients in the cake recipe. Thus, a content container's relationship to other content containers can also be expressed via formatting elements and reflected in the formatting aspect.

A content container can also lack an information aspect and/or lack a formatting aspect. For example, if a "<ul>" tag (unordered list HTML element) nests within it a bulleted list of ingredients indicated by "<li>" tags, the "<ul>" tag lacks an information aspect, but has a formatting aspect that expresses the relationship of the list items to one another. Some content containers can lack a visual aspect entirely, being used predominantly to group other content containers together, perhaps to assign structured data to several other content containers. For example, a content container represented by a "<div>" element can express properties about all of the child content containers within the <div> block, but otherwise express no visual aspect.

Sometimes, the content store service 100 creates a new content store as part of a request to store content 115, as for example when the content to be stored is part of a new entry or document in a notebook application. Sometimes, content 120 may add to or modify an existing content store.

An example of the transformation of the content is depicted inside the dotted circular zone illustrated in FIG. 1. Depicted is a selection of visual content 120 that has several content containers 121. An example is the "cake recipe" (described earlier) that has ingredients, steps, and a photograph, and was clipped from a web page. The content store service 100 can transform the selection of visible content into content with structured data 125. Content store service 100 transforms the visible content 120 into content with structured data 125 by assigning non-visual semantic notation 126 (e.g., identifiers, tags, elements, attributes, properties, or descriptors that are not intended to be visibly rendered on a display) to one or more the content containers. An example of the non-visual semantic notation is described with respect to FIG. 2B.

Content stored and transformed by the content store service 100 may be accessed and/or modified by other client types. Client 130 is representative of a client with a content application 131 having the ability to view and edit visual content. Content application 131 can be a browser, notebook, or productivity application, including an application running inside a web browser or on a mobile device or wearable device. The content application 131 may have various capabilities (e.g., viewing, editing) depending on the application type and the device form factor the application is running on. Sometimes, the content application 131 will be the same type of application, or indeed the very same application, as the application that initiated the clipping and storing of the content as described with respect to content application 111. However, sometimes the content application 131 may be a different type of content application, a different version (e.g., an older version) of the same content application, or a different device variant of the same application, such as a mobile device version (e.g., the Android® App version of Evernote®). This aspect of the environment demonstrates the advantage of the ability of differently capable and older content applications to view and edit the stored visual content while the content store service 100 maintains non-interfering semantic notation that describes structured data in the content store.

Content application 131 is an example of an application that can view and edit the visual content in a content store while remaining agnostic of the structured data and semantic notation in the content store. Content application 131 may request content 135 from the content store service 100, as for example when a notebook application requests to view a notebook note or document (i.e., content store) that stores earlier-clipped content. The content store service 100 may return the content 136. The returned content may include the visual content transformed with transparent semantic notation (as shown, for example, in elements 125 and 126).

Content application 131 can view the content and/or edit it further, for example by adding new visual content, removing visual content, or modifying aspects of the visual content. A request to update the content 137 stored in the content store may then be made to the content store service 100. The content store service 100 may modify visual content in the content store as described in FIG. 3A. Depending on the types of changes made to the visual content, content store service 100 may remove visual content and associated semantic notation, insert new semantic notation for new visual content, or alter information or formatting aspects of a content container.

Cosmetic alternations alterations to the visual content, such as formatting, may not impact the semantic notation at all. Alterations to the information content of the visual element may not impact the semantic notation. To use the recipe example, a correction of a misspelling of an ingredient may alter a content container's information aspect, but not its data type. Further, if a recipe for a dish contains the ingredient "garlic chili sauce," the user might edit the recipe to specify a preferred brand name of chili sauce. Such an edit might alter the content container's information aspect, but would not necessarily result in changes to the semantic notation or structured data aspects.

Figure 3A:
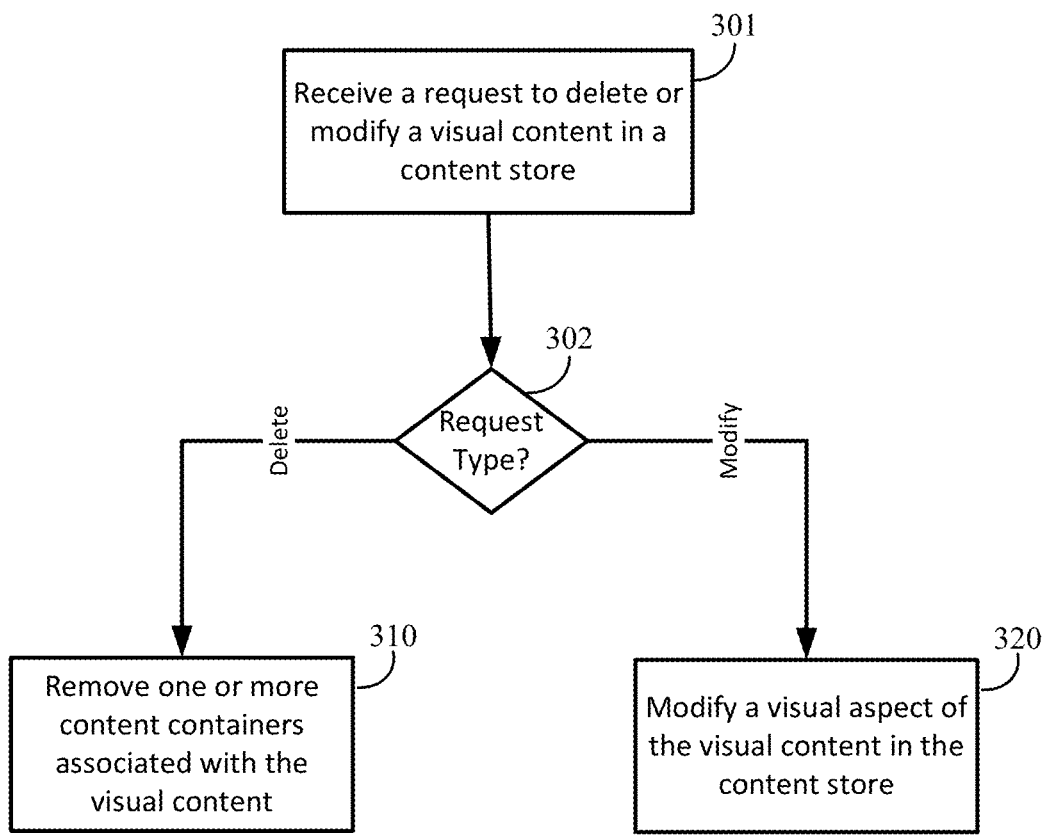
FIG. 3A shows an example process flow for receiving and processing requests to update visual content in a content store.
Figure 3B:
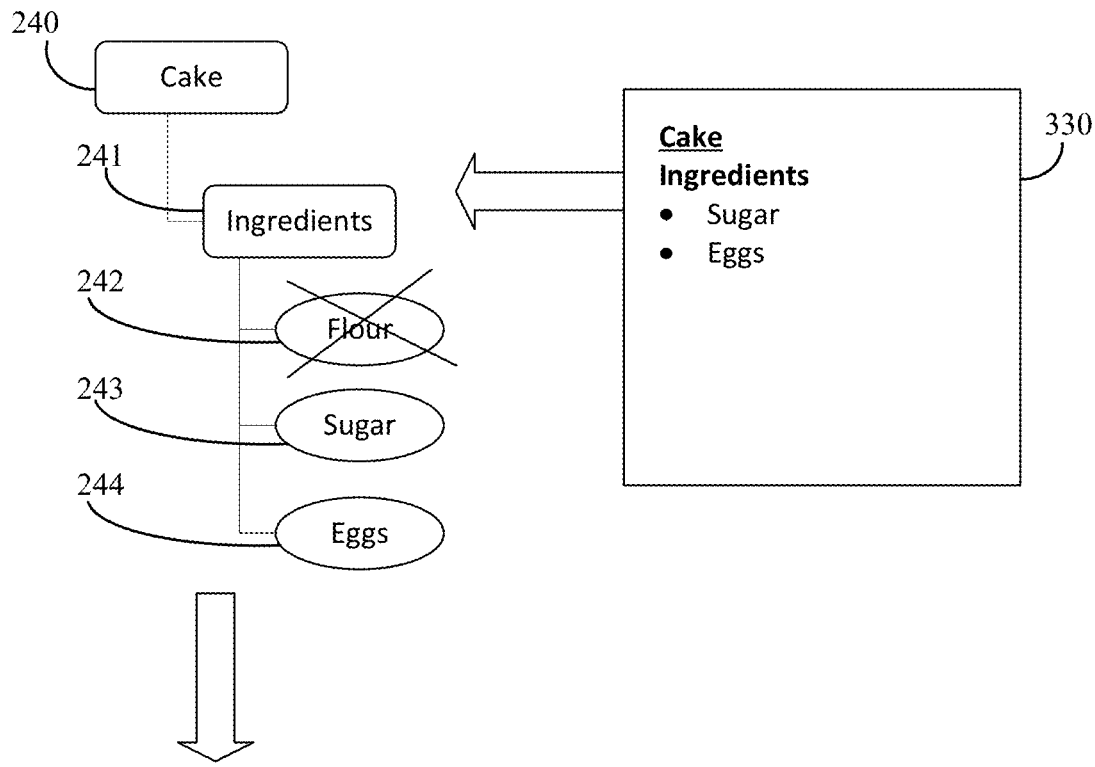
FIGS. 3B-3C show specific examples of a user's arbitrary edit to visual content and corresponding result in the content store.
Figure 3C:
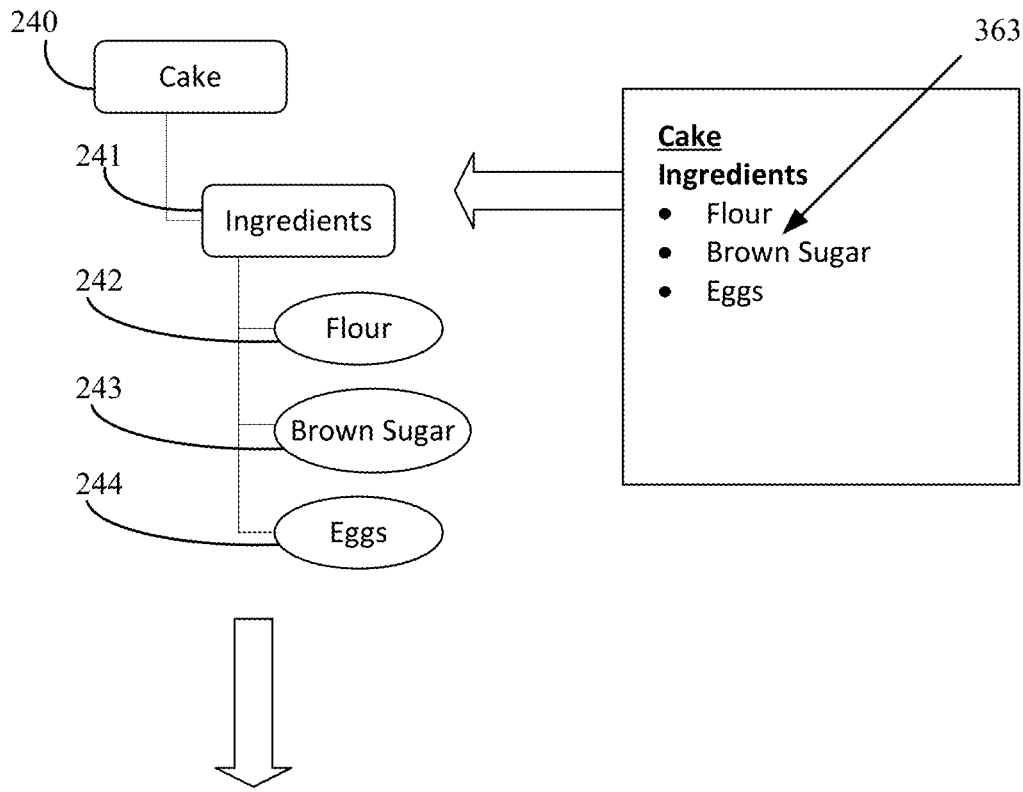

An example process flow and related examples of an implementation including content application 131 is shown in FIGS. 3A-3C.

Content stored and transformed by the content store service 100 may be accessed by clients that view, use, or alter the structured data associated with the semantic notation. Client 140 includes a structured data application 141 that may request structured data 145 from the content store service 100. In some implementations, the content store service 100 exposes an application programming interface that enables a structured data application 141 to query for certain types or values of structured data across a single content store or across multiple content stores. The content store service 100 then returns content and/or structured data 146 associated with the structured data matching the query. For instance, a structured data application 141 can contact the content store service 100 to query a user's repository of content stores for saved desserts containing "cherries." Or, a structured data application 141 may enable a user to create a single shopping list consolidating the ingredients to buy for a group of selected recipes. Techniques included in an application programming interface for structured data are described more fully with respect to FIG. 4.

It should be noted that the separation of content application 111 and 131 and structured data application 141 onto separate clients in FIG. 1 is not intended to be limiting. A single content application may have any or all of the storing, editing, viewing, and structured data capabilities indicated by applications 111, 131, and 141. Also, many types of content applications and structured data applications can be resident on a single client.

Figure 2A:
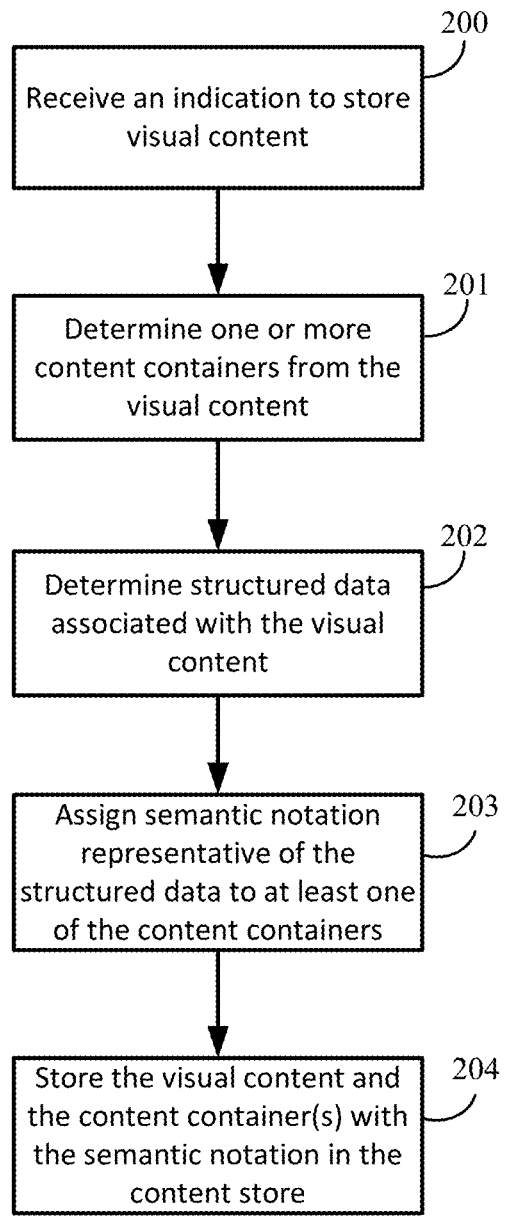
FIG. 2A shows an example process flow for structured data storage and retrieval.

FIG. 2A shows an example process flow for structured data storage and retrieval. The process flow in FIG. 2A may be carried out in some implementations by a content store service 100 as described in FIG. 1. Content store service 100 may receive an indication to store visual content (200) from a content application 111, such as described with respect to FIG. 1.

As noted, a content container can enclose visual content in various ways. Therefore, in response to receiving the content selection, the content store service 100 determines one or more content containers from the visual content (201) that are appropriate for assigning semantic notation. For example, if a list of items indicates the ingredients of a recipe, then semantic notation representative of the items as ingredients may be added in multiple ways in the hierarchy of content containers. In one case, semantic notation indicating a structured data type of "ingredients" may be assigned to the parent list container, to denote that each item in the list is one of a type of ingredients. In another case, semantic notation indicating a structured data type of "ingredient" may be assigned to each of the individual ingredients' content containers.

In some cases, the content store service 100 may determine that no appropriate content container exists in the visual content. In those cases, one or more content containers may be created and inserted at an appropriate place in the visual content graph structure to receive an assignment of semantic notation.

When an appropriate one or more content containers have been identified and/or created, content store service 100 determines structured data associated with the visual content (202). Determining the structured data related to visual content may be performed in various ways, depending on the nature of the implementation and distinct properties of the particular visual content.

In some cases, the visual content contains markup language added by the creator of the content to indicate data types or attributes of the content. For example, a content creator (e.g., the website developer) may add data type information (e.g., a "schema") obtained from a "schema provider" to a web page in order to make the content more accessible and searchable to search engines. The schema from the schema provider may be used along with a "markup format" to augment the visual content with structured data. Examples of schema providers are schema.org and Google Rich Snippets. A schema provider shares a collection of schemas (shared markup vocabularies) that can be used when marking up content (e.g., HTML pages) with a markup format. A schema describes the data type and attribute information for a particular kind of content. For example, a schema might indicate that certain content is a "movie" and that a movie has certain properties, such as a "director," "title," and "release date." Standardized schemas from schema providers are recognized by search services, which are then able to interpret the information on web pages in a more defined way, making searching more accurate.

Schemas are sometimes introduced into content described in HTML using a "markup format." Examples of markup formats are Microdata, RDFa, and JSON-LD. Markup formats provide a standardized method of modifying the HTML so that the search engine can process an individual web page having content that is matched to a schema.

For example, the Microdata markup format describes content using schema.org vocabularies by the use of "<div>" tag attributes that identify a schema for the content within the "<div>" element scope. The values of properties of the schema of individual content are then identified by further attributes that surround the content.

An example of Microdata markup format describing content using schema.org vocabularies is shown below in Table 1:

TABLE 1

Example of Microdata

<div itemscope itemtype ="http://schema.org/Movie">
   <h1 itemprop="name">Avatar</h1>
   <span>Director: <span itemprop="director">James Cameron</span></span>
   <span itemprop="genre">Science fiction</span>
   <a href="../movies/avatar-theatrical-trailer.html" itemprop="trailer"> Trailer </a>
</div>

In cases when the markup format indicates that a schema identifier is included in the content, the content store service 100 may have a readily accessible source of data types that can be used to determine the types of content elements contained in the visual content. The existing structured data markup may be used by the content store service 100 to determine certain structured data for semantic notation. Data type information can be extracted from visual content with existing markup in familiar ways using tools such as the "Microdata2RDF" service or the "node-schema-org" library for programmatically parsing content marked up with common schemas. In some cases, the existing markup may be moved, altered, and/or removed when the content store service assigns semantic notation to the visual content.

In some implementations, the content store service 100 determines the structured data by analysis of the visual content. Analysis of the visual content may occur, for example, when no markup indicating schema information has been provided by a website operator.

A technique for analysis of the visual content used in some implementations is to identify probable schemas for the visual content by comparing the visual content to a collection of templates of known content. Content store service 100 may store one or more such templates of known content. For example, a clipping of visual content that contains a recipe often will have a familiar visual structure containing several visual content zones. The zones include a recipe title, a list of ingredients, and a list of steps/actions that are sometimes separated into paragraphs. In some cases, the list of ingredients and list of steps are specifically labeled as such. These zones help to identify the types of visual content so that schema information can be determined.

In some implementations, the content store service 100 has stored several pre-defined content templates that depict common or likely visual layouts for certain specific types of content, such as recipes, movies, books, or music. In some cases those visual content templates may be determined by gleaning formatting language from common content websites, such as recipe.com or imdb.com. For example, "recipe.com" sometimes indicates its ingredient lists with HTML formatting codes such as "<ul id="ingredientList">". The "id" attribute is recognized by the content store service 100 to match a content template stored by the content store service 100 for "recipe.com" recipes. The content store service 100 can then use the known pattern to process the content for structured data, knowing that the list items nested within a "ul" element with "id=ingredientList" are the recipe's ingredients.

In some cases, more generalized schema determination methods may be used. For instance, visual content formatted as a bulleted list (e.g., indicated in HTML by an "<ul>" tag with nested "<li>" tags) may indicate to the content store service that the content contains an entity with sub-entities. The content store service 100 may perform dictionary or web searches on the information aspects of the content to assist in identifying the entities in the visual content. For example, by using text matching or word lookup, the content store service may determine that the list contains "ingredients," and thus that each list item denotes an individual ingredient. The content store service 100 may then contact a schema provider to obtain schemas for "ingredient" data types.

In certain implementations the content store service 100 can use learning techniques to discern patterns of visual content that, over time, inform the content store service's choice of structured data schemas.

In some implementations, structured data can be determined by identifying the source of the visual content from a source identifier (e.g., a URL). The source identifier of the visual content in many cases is communicated by the web clipper to the content application along with the visual content. Using the source identifier, structured data can sometimes be obtained from an indexing service. An indexing service (e.g. Microsoft Bing®) contains a plurality of structured data associated with content that the indexing service has already digested or "crawled." The indexing service may index or sort the structured data by the source identifier. The content store service 100 can contact the indexing service with the source identifier and receive back from the indexing service the structured data created for the visual content identified by the source identifier.

Furthermore, once the source is identified, in some cases structured data can be obtained by contacting the server or services designated by the source identifier. For example, the website of the content creator that provided the visual content may host a structured data service (e.g., oEmbed) that provides a structured data representation of content hosted on the website. The content store service 100 may contact the website, via a call to its structured data service, to request the structured data associated with the visual content indicated by the source identifier.

In some cases, other content that links to the visual content can assist in identifying visual content. Take, for example, a series of unidentified images hosted on a website. As part of the unidentified images, an image containing a photograph of an ostrich may be included. There is no structured data associated with the visual content containing the ostrich image, but the image is linked to by an external website that contains a dictionary entry for an "ostrich." The link to the ostrich from the external website, which itself contains structured data for an ostrich, can be used to associate appropriate structured data (e.g., that the visual content contains an "ostrich" bird type) to the visual content. The content store service 100 may obtain link information by submitting the source identifier of the visual content to an "analyzer" or search engine that returns the external links to the identified visual content. An example of an analyzer is the "Open Site Explorer" at Moz.com.

Having determined the structured data associated with the visual content, semantic notation representative of the structured data is assigned to the content containers (203) that were determined previously. This processing function may be performed by a content store service 100 as described in FIG. 1.

The semantic notation assigned to the content containers identifies the structured data that relates to the type of content described in the visual content. The semantic notation may sometimes use non-visual identifiers, such as tags, elements, attributes, or properties. Sometimes, additional content containers (e.g., tags, elements) may be nested hierarchically within the existing content containers as attachment points for semantic notation. The additional content containers can have attributes that further identify, e.g., structured data types, unique identifiers, or parent identifiers to describe a hierarchy of content containers. In some cases, additional attributes describing structured data or supporting functionality of the content store service 100 may be added to existing content containers.

The semantic notation may be introduced using non-visual identifiers, such as tags, elements, and attributes of an existing markup language like HTML, RDFa, or Extensible Markup Language (XML). For example, if the visual content is described in HTML, the semantic notation can take the form of additional <div> and/or <span> tags nested hierarchically within the content containers.

Advantageously, the content store service 100 assigns the semantic notation to the visual content in a manner that does not impact the display or formatting of the visual content. Since the semantic notation does not re-order, re-process, rearrange, or—other than in the manner described—alter the information or formatting aspects of the markup language describing the original visual content, the additional tags, elements, attributes, or properties may not impact, for example, older or less feature-rich content applications.

The visual content including content containers with the semantic notation are then saved in the content store (204) using familiar techniques for storing files, data elements, or data structures as appropriate for the type of content store.

Figure 2B:
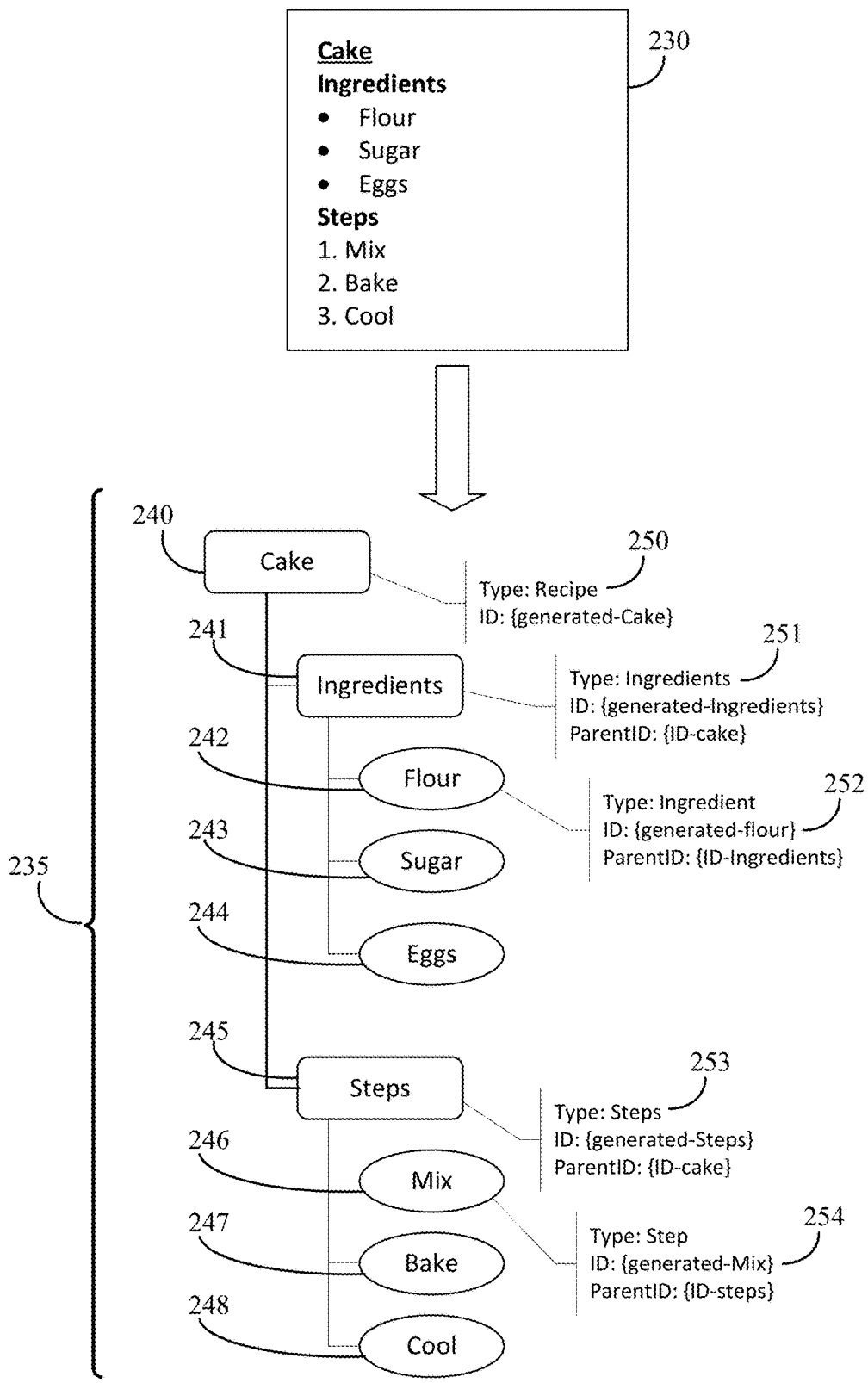
FIG. 2B shows an example of visual content and a representation of the content containers within the visual content.

FIG. 2B shows an example of visual content and a representation of the content containers within the visual content. Some content containers include examples of a semantic notation for identifying certain kinds of structured data.

In FIG. 2B, a simple example of visual content 230 is shown for a "Cake" recipe. Two lists are shown as part of the cake recipe, "Ingredients" and "Steps." The ingredients include "flour," "sugar," and "eggs," and the steps are "mix," "bake," and "cool." Visual content 230 is of the sort that might be clipped or copied from a web page.

A hierarchical representation of the content containers expressed by the visual content 230 is shown in grouping 235. The nested structure of the content containers is maintained along with their information aspect 240-248, and associated with some content containers is a set of sematic notations 250-254. The non-limiting example of a high-level semantic notation shown in the figure describes both certain aspects of the structured data represented by the visual content, and also identifiers for content containers and relationships between content containers that may be used in some cases.

For example, content store service can add semantic notation 250 to the "cake" recipe container 240 that indicates its structured data type ("Type: Recipe") and a unique identifier ("ID: {generated-Cake}"). The unique identifier can be used to assist a content store service 100 in determining which items have been altered, as well as in some cases to track the hierarchy of individual content containers.

A child container of Cake 240 is the Ingredients list 241. Ingredients 241 also may have associated semantic notation 251 that shows the structured data type "Type: Ingredients" and a generated unique identifier ("ID: {generated-Ingredients}"), as before. The parent-child relationship between a cake recipe and its ingredients may be indicated by a "ParentID: {ID-cake}" semantic notation 251 on the "ingredients" 241 content container that references the unique identifier associated with the "Cake" content container 240.

Content in the "Ingredients" content container 241 is depicted as child content containers Flour 242, Sugar 243, and Eggs 244. An example of semantic notation 252 for Flour 242 is shown in FIG. 2B; semantic notations for Sugar 243 and Eggs 244 are not shown in FIG. 2B, but may be similar to semantic notation 252. In semantic notation 252, the structured data type ("Type: Ingredient") is assigned to Flour 242 to indicate that "Flour" is a type of ingredient in this context. A unique identifier is also assigned ("ID: {generated-flour}"), as is an indicator that Flour 242 is a child of ingredients ("ParentID: {ID-Ingredients}").

Another child content container of Cake 240 is the Steps list 245. Associated with Steps 245 is semantic notation 253, which contains elements similar to those previously discussed above. In semantic notation 253, a structured data type ("Type: Steps") is assigned to Steps 245, as well as a unique identifier ("ID: {generated-Steps}") and an indicator that the parent is the Cake 240 content container ("ParentID: {ID-cake}").

Content in the Steps content container 245 is depicted as children Mix 246, Bake 247, and Cool 248. An example semantic notation 254 is shown associated with the Mix 246 content container. Once again, a structured data type ("Type: Step") and an indicator of the parent, Steps 245 ("ParentID: {ID-steps}") is assigned, and a unique identifier is generated for the Mix 246 content container ("ID: {generated-Mix}").

It should be noted that the depiction of content containers and their associated semantic content in FIG. 2B is exemplary only and not intended to be limiting. Other representations of visual content and the associated semantic notation are possible.

To illustrate further, FIG. 2C shows an example of HTML with Microdata markup language for the "Cake" recipe in FIG. 2B. Note that in FIG. 2C certain unimportant markup language has been removed for clarity. The HTML with Microdata in FIG. 2C references the "Recipe" schema from schema provider "schema.org" using an "itemtype" property attached to a "<div>" element that surrounds the markup block (line 261). To indicate the name of the recipe, the original information aspect of the "cake" recipe label is surrounded by a "<span>" element that indicates the "name" item property is set to "Cake" (line 262).

Further along in the code listing in FIG. 2C, an "Ingredients" list is indicated by an unordered list HTML element ("<ul>") in line 263. Lines 264-266 denote the list items in the ingredients list (Flour, Sugar, and Eggs) and also indicate their structured data with the semantic notation "itemprop=ingredients". Line 264, for example, indicates an entire content container, including the information aspect (the text "Flour"), the formatting aspect (the list item), and the structured data aspect (the "itemprop=ingredients" indicating that "Flour" is an ingredient of this recipe) from the content store. Lines 267-268 close the open tags "<div>" and "<ul>" tags to show the nesting of the content container hierarchy.

Sometimes, visual content may be inserted into an existing content store, both by user entry or by the user clipping additional visual content into an existing content store. When a request to store new visual content occurs, the content store service 100 determines one or more content containers from the visual content (201). Structured data associated with the new visual content is then determined (202). Semantic notation representative of the structured data is assigned to one or more of the content containers (203), such that the semantic notation does not affect the visual aspect of the visual content. The new visual content, including any new content containers and semantic notation, are then stored in the existing content store. In this manner, the visual aspect and the structured data aspect of the new visual content is inserted into the hierarchy of content containers in the content store.

Using the "Cake" recipe from FIG. 2B for illustration, suppose that the user of content application 131 wants to insert new ingredient "Cinnamon" in the ingredients list. The user indicates a request to store content by inserting the text "Cinnamon" as a new list item after "Eggs" by using whatever method is appropriate for inserting text in the visual editing interface of the content application 131.

The text is inserted visually to the user, and the request is transmitted to the content store service 100, which may implement the process flow of FIG. 2A. FIG. 2D shows an example of HTML with Microdata markup language for the "Cake" recipe in FIG. 2B. For clarity, the same markup language is shown in FIG. 2D as was shown in FIG. 2C, with the exception of differing line 270. In line 270, the HTML for the new "Cinnamon" ingredient is shown. The information aspect of the content container is indicated by the text "Cinnamon." The formatting aspect is indicated both by the insertion point of the new ingredient after "Eggs," and by the content container's element type of list item (denoted by the "<li>" and "</li>" tags surrounding "Cinnamon"). The structured data aspect of the content container is indicated by the semantic notation that "Cinnamon" is a type of ingredient using the "itemprop=ingredients" property of the "<li>" tag.

Certain implementations facilitate updating the visual content stored in a content store by a content application 131 as described with respect to FIG. 1. FIG. 3A shows an example process flow for receiving and processing requests to update visual content in a content store. In FIG. 3A, a request is received to delete or modify a visual content in a content store (301). The request type (302) determines the appropriate path for the process flow to follow: "delete" or "modify." It should be noted that the process flow of FIG. 3A is illustrative of operations on a single item of visual content, but that such operations may be carried out iteratively, in sequence or in parallel, on multiple items of visual content.

When a "delete" operation is requested on the visual content, one or more content containers associated with the visual content are removed (310) from the content store. Returning to FIG. 2B momentarily for illustration, suppose that visual content as viewed through a content application 131 shows a list of ingredients as shown in FIG. 2B. The user of content application 131 wants to delete "Flour" from the ingredients list in the Cake recipe. The user proceeds to select the text "Flour" and indicates a "delete" request through some interface aspect of the content application 131, e.g., via a "delete" menu item or by pressing the "del" key on the keyboard. The text "Flour" is removed from the visual editing interface of the content application 131. Referring again to FIG. 2B, content container 242 and the associated semantic notation 252 are removed from the content store.

In an example where HTML with Microdata is the markup language used to describe a content container's information, formatting, and structured data aspects, each of the aspects are removed when the visual content is removed. In other words, while the user sees the text "Flour" (the information and formatting aspect) removed from the visual editing interface, the semantic notation describing the structured data associated with the content container is also removed from the markup language. The removal of the semantic notation is achieved because the semantic notation has been added as a property of the content container.

FIG. 3B shows an example of a user's arbitrary edit to visual content and corresponding result in the content store. Referring to FIG. 3B, a visual content 330 having associated semantic notation may be edited using a notebook application or other content application. The visual content 330 may be a view of visual content 230 after the visual content 230 had semantic notation assigned as shown in FIG. 2B. Thus, when the item "flour" is removed from the visual content 330 using an editing feature of the notebook application or other content application, the child content container Flour 242 is removed at the content store. Advantageously, the content and associated semantic notation in the "Ingredients" content container 241 remains unaffected.

As a further illustration, HTML with Microdata markup language for the "Cake" recipe from FIG. 2B is shown with the modification. Note that in FIG. 3B certain unimportant markup language has been removed for clarity. The HTML with Microdata in FIG. 3B references the "Recipe" schema from schema provider "schema.org" using an "itemtype" property attached to a "<div>" element that surrounds the markup block (line 351). To indicate the name of the recipe, the original information aspect of the "cake" recipe label is surrounded by a "<span>" element that indicates the "name" item property is set to "Cake" (line 352).

Further along in the code listing in FIG. 3B, an "Ingredients" list is indicated by an unordered list HTML element ("<ul>") in line 353. Lines 354-356 denote the list items in the ingredients list (Flour, Sugar, and Eggs) and also indicate their structured data with the semantic notation "itemprop=ingredients". Here, the deletion of the content container for Flour is depicted for clarity by strikethrough text, but an implementation would operatively remove the entirety of line 354, including the "<li>" tag and its enclosed text, from the markup language in the content store. The removal of line 354 effectively removes the entire content container, including the information aspect (the text "Flour"), the formatting aspect (the list item), and the structured data aspect (the "itemprop=ingredients" indicating that "Flour" is an ingredient of this recipe) from the content store. Lines 357-358 close the open tags "<div>" and "<ul>" tags to show the nesting of the content container hierarchy.

FIG. 3C shows another example of a user's arbitrary edit to visual content and corresponding result in the content store. When a "modify" operation is requested on visual content, a visual aspect of the visual content is modified in the content store (320). Using the "Cake" recipe from FIG. 2B once again for illustration, suppose that, after semantic notation has been assigned to visual content 230, the user of a content application 131 accesses and wants to modify "Sugar" in the ingredients list to say "Brown Sugar" 363. The user generates a "modify" request by inserting the text "Brown" in front of the text "Sugar" using whatever method is appropriate for editing text in the visual editing interface of the content application 131. Thus, when the item "Brown" 363 is added within the visual content using an editing feature of the notebook application or other content application, the visual content within child content container Sugar 243 is updated at the content store. Advantageously, the content and associated semantic notation in the "Sugar" child content container 243 and the "Ingredients" content container 241 remains unaffected.

As a further illustration, HTML with Microdata markup language for the "Cake" recipe from FIG. 2B is shown with the modification. For clarity, the same markup language is shown in FIG. 3C as was shown in FIG. 3B, with the exception of differing lines 360-361. The HTML for the "Flour" ingredient (line 360) is no longer shown in strikethrough text, as the ingredient has not been deleted. In line 361, "Brown Sugar" is now indicated as the information aspect of the ingredient item represented by content container 242 in FIG. 2B. (The text for "Brown" has been underlined for clarity to indicate insertion, though the underlining is not part of the HTML).

Here, the modification to the visual aspect of the content container has been made while maintaining the semantic notation that was associated with the content container. Advantageously, the structured data aspect of the content container has not been modified. Indeed, since the semantic notation representing the structured data aspect was assigned to the content container 242 non-intrusively, the modification to the visual aspect can occur with only content application modifications. Note that, in this specific example, the formatting aspect has also not been modified, though the formatting (or at least some of the formatting) could have been modified as well via this process flow.

As a result of these techniques, different types of content applications, including different versions of the same content application (e.g., prior or later versions, or versions for different kinds of devices or platforms), may update the same content store without affecting the function of the other types of content applications. Furthermore, since the semantic notation has not been affected, structured data applications also can continue to view visual content even when the visual aspect of the visual content has been modified. For example, if "sugar" was modified by the user to "brown sugar," as above, a structured data application returns the modified visual content ("brown sugar") in response to query for ingredients of the recipe.

It should be noted that the use of HTML with Microdata as an operative example here and elsewhere is not intended to be limiting. Other markup languages capable of encoding information, formatting, and structured data aspects for visual content arranged in a graph structure are possible, e.g., RDFa, XML, and even custom markup languages.

Content stored and transformed by the content store service 100 can be accessed by structured data applications that view and use the structured data associated with the semantic notation. As noted in FIG. 1, client/service 140 can include a structured data application 141 that requests structured data from the content store service 100. In some implementations, the content store service 100 exposes an application programming interface (API) that enables a structured data application or service 141 to query for certain types or values of structured data across a single content store or across multiple content stores.

An API is generally a set of programming instructions and standards for enabling two or more applications to communicate with each other. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API and related components may be stored in one or more computer readable storage media. An API is commonly implemented as a set of Hypertext Transfer Protocol (HTTP) request messages and a specified format or structure for response messages according to a REST (Representational state transfer) or SOAP (Simple Object Access Protocol) architecture.

Figure 4:
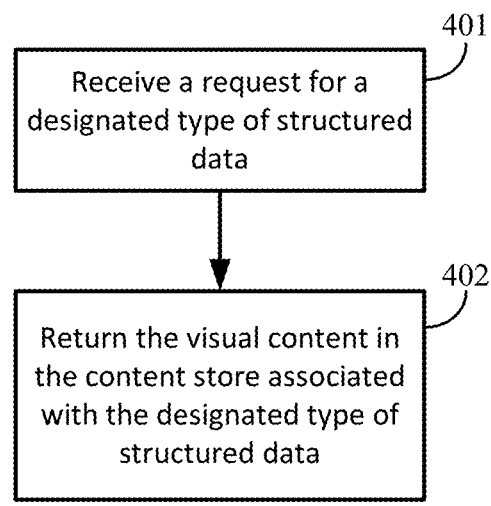
FIG. 4 shows an example process flow for an implementation of a structured data API.

FIG. 4 shows an example process flow for an implementation of a structured data API. The content store service 100 (the API-implementing component) can receive a request for a designated type of structured data (401), perhaps via a request query. Visual content and/or structured data associated with the designated structured data matching the query are returned (402) to the API-calling component.

For instance, a structured data application 141 may use an API to contact the content store service 100 to query a user's content store or content stores for "recipes." Or, a structured data application 141 may use an API to request desserts saved in the user's content store containing "cherries." Or, a structured data application 141 may use the API to enable a user to create a single shopping list consolidating the ingredients to buy for a group of selected recipes. In some cases, the query may be phrased in the form of a natural language query, e.g. "all recipes with vanilla as an ingredient." The structured data application 141 may interpret the natural language query and then request the structured data and/or associated visual content matching the query. Third-party free or commercial services for shopping integration (e.g., Amazon Fresh® and FreshDirect®) are one type of structured data application 141 that can use the API to communicate with the content store service to obtain ingredients lists for selected recipes. The API may also provide the ability for data extraction and indexing to be performed using data management services such as DocDB and MongoDB®.

Advantageously, because of the described semantic notation, even if visual content was modified after storing the visual content in the content store, a request for a designated type of structured data can still retrieve the data. For example, the change of sugar to brown sugar in the illustrative example of FIG. 3C should not break the semantic notation indicating sugar as an ingredient. Thus when a structured data application 141 requests the "ingredients" from the content store, "brown sugar" would be returned.

Figure 5:
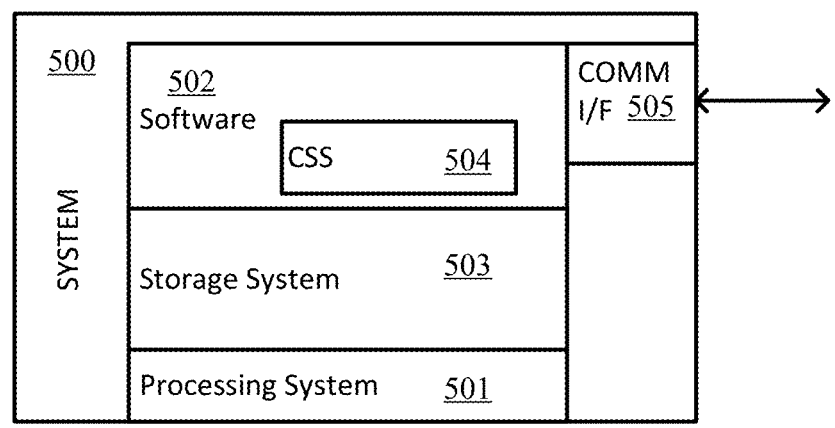
FIG. 5 shows a block diagram illustrating components of a computing device or system used in some implementations of the described content store service.

FIG. 5 shows a block diagram illustrating components of a computing device or system used in some implementations of the described content store service. For example, any computing device operative to run a content store service 100 or intermediate devices facilitating interaction between other devices in the environment may each be implemented as described with respect to system 500, which can itself include one or more computing devices. The system 500 can include one or more blade server devices, standalone server devices, personal computers, routers, hubs, switches, bridges, firewall devices, intrusion detection devices, mainframe computers, network-attached storage devices, and other types of computing devices. The hardware can be configured according to any suitable computer architectures such as a Symmetric Multi-Processing (SMP) architecture or a Non-Uniform Memory Access (NUMA) architecture.

The system 500 can include a processing system 501, which may include a processing device such as a central processing unit (CPU) or microprocessor and other circuitry that retrieves and executes software 502 from storage system 503. Processing system 501 may be implemented within a single processing device but may also be distributed across multiple processing devices or sub-systems that cooperate in executing program instructions.

Examples of processing system 501 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 503 may comprise any computer readable storage media readable by processing system 501 and capable of storing software 502 including content store service 100 and content store service API. Storage system 503 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In no case do storage media consist of a propagated signal. In addition to storage media, in some implementations, storage system 503 may also include communication media over which software 502 may be communicated internally or externally.

Storage system 503 may be implemented as a single storage device but may also be implemented across multiple storage devices or sub-systems co-located or distributed relative to each other. Storage system 503 may include additional elements, such as a controller, capable of communicating with processing system 501.

Software 502 may be implemented in program instructions and among other functions may, when executed by system 500 in general or processing system 501 in particular, direct system 500 or processing system 501 to operate as described herein for enabling structured content storage and retrieval. Software 502 may provide program instructions 504 that implement a content store service 100. Software 502 may implement on system 500 components, programs, agents, or layers that implement in machine-readable processing instructions the methods described herein as performed by content store service 100 (as instructions 504).

Software 502 may also include additional processes, programs, or components, such as operating system software or other application software. Software 502 may also include firmware or some other form of machine-readable processing instructions executable by processing system 501.

In general, software 502 may, when loaded into processing system 501 and executed, transform system 500 overall from a general-purpose computing system into a special-purpose computing system customized to facilitate structured content storage and retrieval. Indeed, encoding software 502 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage.

System 500 may represent any computing system on which software 502 may be staged and from where software 502 may be distributed, transported, downloaded, or otherwise provided to yet another computing system for deployment and execution, or yet additional distribution.

In embodiments where the system 500 includes multiple computing devices, one or more communications networks may be used to facilitate communication among the computing devices. For example, the one or more communications networks can include a local, wide area, or ad hoc network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 505 may be included, providing communication connections and devices that allow for communication between system 500 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of system 500 may be included in a system-on-a-chip (SoC) device. These elements may include, but are not limited to, the processing system 501, a communications interface 505, and even elements of the storage system 503 and software 502.

Figure 6:
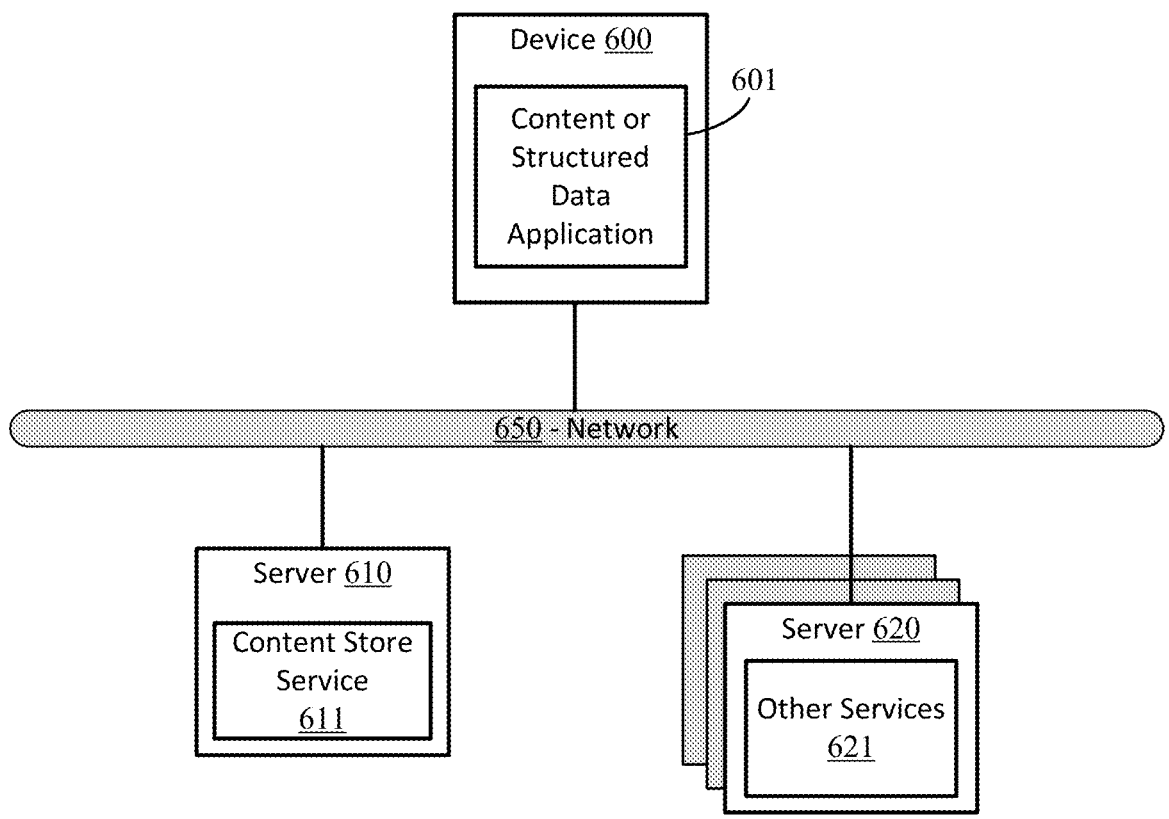
FIG. 6 illustrates an example system architecture in which an implementation of techniques for structured content storage and retrieval may be carried out.

FIG. 6 illustrates an example system architecture in which an implementation of techniques for structured content storage and retrieval may be carried out. In the example illustrated in FIG. 6, a content or structured data application/service 601 for interacting with visual content or structured data can be implemented on a device 600, which may be or include computing systems such as a laptop, desktop, tablet, reader, mobile phone, and the like. In those implementations where a content or structured data application operates as a service, perhaps as a cloud service accessible to many users, device 600 can include one or more blade server devices, standalone server devices, personal computers, routers, hubs, switches, bridges, firewall devices, intrusion detection devices, mainframe computers, network-attached storage devices, and other types of computing devices.

Content store service 611 may be implemented as software or hardware (or a combination thereof) on server 610, which may be an instantiation of system 500. The features and functions of a content store service 611 may be callable by device 600 or content or structured data application 601 via an API.

The content store service 611 may communicate with other services 621, which may provide capabilities such as schema services (i.e., the other service is a schema provider), search services, dictionary searches, or other services that may be useful for determining structured data or semantic notation associated with visual content. Other services 621 may be implemented on server 620, which may itself be an instantiation of a system similar to that described with respect to system 500 or aspects thereof. Many other services may be available in a given environment.

Communications and interchanges of data between components in the environment may take place over network 650. The network 650 can include, but is not limited to, a cellular network (e.g., wireless phone), a point-to-point dial up connection, a satellite network, the Internet, a local area network (LAN), a wide area network (WAN), a Wi-Fi network, an ad hoc network, an intranet, an extranet, or a combination thereof. The network may include one or more connected networks (e.g., a multi-network environment) including public networks, such as the Internet, and/or private networks such as a secure enterprise private network.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain aspects of the invention provide the following non-limiting embodiments:

Example 1

A system comprising: one or more computer readable storage media; a processing system; program instructions for a content store service stored on the one or more computer readable storage media that direct the processing system to, in response to receiving an indication to store a visual content: determine one or more content containers for the visual content; determine structured data associated with the visual content; assign semantic notation representative of the structured data to at least one of the one or more content containers; and store the visual content and the at least one content container with the semantic notation in a content store stored on the one or more computer readable storage media.

Example 2

The system of example 1, further comprising program instructions for an application programming interface stored on the computer readable storage media that direct the processing system to, in response to receiving a request for a designated type of structured data, return the visual content in the content store associated with the designated type of structured data.

Example 3

The system of example 1 or 2, further comprising program instructions stored on the one or more computer readable storage media that direct the processing system to, in response to receiving a request to delete or modify a visual content in a content store: when the request is to delete the visual content, remove one or more content containers associated with the visual content from the content store; and when the request is to modify the visual content, modify a visual aspect of the visual content in the content store.

Example 4

The system of any of examples 1-3, further comprising program instructions stored on the one or more computer readable storage media that direct the processing system to: receive, from a first content application, a modification to a particular visual content of the content store, the content store comprising at least one content container with an associated semantic notation, wherein the modification to the particular visual content is within one of the at least one content container, wherein the first content application does not recognize the semantic notation, the semantic notation remaining on the one of the at least one content container regardless of the modification to the particular visual content.

Example 5

The system of any of examples 1-4, further comprising program instructions stored on the one or more computer readable storage media that direct the processing system to: in response to receiving, from a second content application, a request for the particular visual content, provide, to the second content application, the particular visual content having the modification and the semantic notation associated therewith.

Example 6

The system of example 5, wherein the first content application is a different version from the second content application.

Example 7

The system of any of examples 1-6, wherein the program instructions to determine the one or more content containers for the visual content comprise instructions that direct the processing system to identify an existing content container in the visual content.

Example 8

The system of any of examples 1-7, wherein the program instructions to determine the one or more content containers for the visual content comprise instructions that direct the processing system to create a new content container.

Example 9

The system of any of examples 1-8, wherein the program instructions to determine structured data associated with the visual content comprise instructions that direct the processing system to analyze a schema in the visual content.

Example 10

The system of any of examples 1-9, wherein the program instructions to determine structured data associated with the visual content comprise instructions that direct the processing system to: identify one or more probable schemas for the visual content by comparing the visual content to at least one content template of known content stored on the one or more computer readable storage media; and request the one or more probable schemas from a schema provider.

Example 11

The system of any of examples 1-10, wherein the program instructions to determine structured data associated with the visual content comprise instructions that direct the processing system to: identify a source of the visual content from a source identifier; and retrieve the structured data from the source of the visual content.

Example 12

The system of any of examples 1-11, wherein the program instructions to determine structured data associated with the visual content comprise instructions that direct the processing system to: identify a source identifier associated with the visual content; and retrieve the structured data from an index service having a plurality of structured data indexed by the source identifier associated with the visual content.

Example 13

The system of any of examples 1-12, wherein the program instructions to assign semantic notation representative of the structured data to the at least one of the one or more content containers comprise instructions that direct the processing system to: append a non-visual identifier indicating a structured data type to the visual aspect of the at least one of the one or more content containers.

Example 14

The system of any of examples 1-13, wherein the semantic notation is described in HTML.

Example 15

The system of any of examples 1-14, wherein the visual content is unstructured or semi-structured by having some existing structure, which is then supplemented with the structure supplied by the described semantic notation.

Example 16

A method of facilitating structured data in a content store, the method comprising: receiving an indication to store a visual content that is unstructured or semi-structured; determining one or more content containers from the visual content; determining structured data associated with the visual content; assigning semantic notation representative of the structured data to at least one of the one or more content containers; storing the visual content and the at least one content container with the semantic notation in the content store; and receiving, from a first content application, a modification to a particular visual content having an associated semantic notation, the modification comprising an edit to an arbitrary location, the semantic notation remaining on the one of the at least one content container regardless of the modification to the particular visual content.

Example 17

The method of example 16, wherein determining one or more content containers for the visual content comprises one or more of creating a new content container and identifying an existing content container in the visual content.

Example 18

The method of example 16 or 17, wherein determining structured data comprises analyzing a schema in the visual content.

Example 19

The method of any of examples 16-18, wherein determining structured data comprises: identifying one or more probable schemas for the visual content by comparing the visual content to at least one content template of known content; and requesting the probable schemas from a schema provider.

Example 20

The method of any of examples 16-19, wherein assigning semantic notation representative of the structured data to the at least one of the one or more content containers comprises: appending a non-visual identifier indicating a structured data type to the visual aspect of the at least one of the one or more content containers.

Example 21

The method of any of examples 16-20, further comprising: receiving a request for a designated type of structured data; and returning the visual content in the content store associated with the designated type of structured data.

Example 22

The method of any of examples 16-21, wherein the first content application does not recognize structured content.

Example 23

The method of any of examples 16-21, wherein the first content application is a notebook application.

Example 24

The method of any of examples 16-23, carried out on a server.

Example 25

A method comprising: receiving a first request for a first designated type of structured data in a content store, the content store comprising at least one content container with an associated semantic notation; in response to receiving the first request, providing at least one visual content from the content store associated with the first designated type of structured data; receiving, from a content application, a modification to one of the at least one visual content associated with the first designated type of structured data, wherein the modification is within one of the at least one content container, the semantic notation remaining on the one of the at least one content container regardless of the modification; receiving a second request for the first designated type of structured data in the content store after the modification to the one of the at least one visual content; and in response to receiving the second request, providing at least one visual content from the content store associated with the first designated type of structured data, wherein the at least one visual content provided in response to the second request includes the visual content having the modification.

Example 26

The method of example 25, wherein the content application is a notebook application.

Example 27

The method of example 25 or 26, further comprising: in response to receiving, from a second content application, a request for the particular visual content, providing to the second content application, the particular visual content having the modification and the semantic notation associated therewith.

Example 28

The method of any of examples 25-27, further comprising: receiving an indication to store an identified visual content; determining one or more content containers for the identified visual content; determining structured data associated with the identified visual content; assigning semantic notation representative of the structured data to at least one of the one or more content containers for the identified visual content; and storing the identified visual content and the at least one content container for the identified visual content with the assigned semantic notation in the content store.

Example 29

The method of example 28, wherein the assigned semantic notation for the identified visual content comprises the first designated type of structured data, the identified visual content being included in the at least one visual content provided in response to the first request and/or second request.

Example 30

The method of example 28 or 29, wherein the identified visual content is unstructured.

Example 31

The method of example 28 or 29, wherein the identified visual content is semi-structured by having some existing structure, which is then supplemented with the structure supplied by the described semantic notation.

Example 32

The method of any of examples 25-31, wherein determining the one or more content containers for the identified visual content comprises one or more of creating a new content container and identifying an existing content container in the identified visual content.

Example 33

The method of any of examples 25-32, wherein determining the structured data comprises analyzing a schema in the identified visual content.

Example 34

The method of any of examples 25-33, wherein determining structured data comprises: identifying one or more probable schemas for the identified visual content by comparing the identified visual content to at least one content template of known content; and requesting the probable schemas from a schema provider.

Example 35

The method of any of examples 25-34, wherein assigning semantic notation representative of the structured data to the at least one of the one or more content containers comprises: appending a non-visual identifier indicating a structured data type to the visual aspect of the at least one of the one or more content containers.

Example 36

A system comprising: a means for receiving an indication to store a visual content; a means for determining one or more content containers from the visual content; a means for determining structured data associated with the visual content; a means for assigning semantic notation representative of the structured data to at least one of the one or more content containers; and a means for storing the visual content and the at least one content container with the semantic notation in a content store.

Example 37

The system of example 36, further comprising: a means for receiving, from a first content application, a modification to a particular visual content having an associated semantic notation, the modification comprising an edit to an arbitrary location, the semantic notation remaining on the one of the at least one content container regardless of the modification to the particular visual content.

Example 38

A system comprising means for performing the methods of any of examples 16-35.

Example 39

A system comprising: a means for receiving a first request for a first designated type of structured data in a content store, the content store comprising at least one content container with an associated semantic notation; a means for providing at least one visual content from the content store associated with the first designated type of structured data in response to receiving the first request; a means for receiving, from a content application, a modification to one of the at least one visual content associated with the first designated type of structured data, wherein the modification is within one of the at least one content container, the semantic notation remaining on the one of the at least one content container regardless of the modification; a means for receiving a second request for the first designated type of structured data in the content store after the modification to the one of the at least one visual content; and a means for providing at least one visual content from the content store associated with the first designated type of structured data in response to receiving the second request, wherein the at least one visual content provided in response to the second request includes the visual content having the modification.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:
1. A system comprising:
one or more computer readable storage media;
a processing system; and
program instructions for a content store service stored on the one or more computer readable storage media that direct the processing system to:
 receive, from a notebook application, an indication to store a visual content, the visual content comprising text, or images, or handwritten ink strokes, or a combination thereof;
 in response to receiving the indication to store the visual content:
  determine one or more content containers for the visual content;
  determine structured data associated with the visual content, wherein the structured data comprises entities identified from sources including a dictionary;
  assign semantic notation representative of the structured data to at least one of the one or more content containers, wherein the semantic notation indicates a structured data type for a corresponding entity identified in the structured data, wherein the semantic notation is separate from an information aspect and a formatting aspect of the visual content; and
  store the visual content and the at least one of the one or more content containers with the semantic notation in a content store stored on the one or more computer readable storage media;
 in response to receiving a request for a designated structured data type, query the content store for the visual content in the content store having the semantic notation associated with the designated structured data type; and
 return the visual content in the content store having the semantic notation associated with the designated structured data type.

2. The system of claim 1, further comprising program instructions stored on the one or more computer readable storage media that direct the processing system to, in response to receiving a request to delete or modify a particular visual content in the content store:
 when the request is to delete the particular visual content, remove one or more content containers associated with the particular visual content from the content store; and
 when the request is to modify the particular visual content, modify a visual aspect of the particular visual content in the content store.

3. The system of claim 1, further comprising program instructions stored on the one or more computer readable storage media that direct the processing system to:
 receive, from a first content application, a modification to a particular visual content of the content store, the content store comprising at least one content container with an associated semantic notation, wherein the modification to the particular visual content is within an associated content container, wherein the first content application does not recognize the associated semantic notation, the associated semantic notation remaining on the associated content container regardless of the modification to the particular visual content.

4. The system of claim 3, further comprising program instructions stored on the one or more computer readable storage media that direct the processing system to:
in response to receiving, from a second content application, a request for the particular visual content,
provide, to the second content application, the particular visual content having the modification and the associated semantic notation associated therewith.

5. The system of claim 4, wherein the first content application is a different version from the second content application.

6. The system of claim 1, wherein the program instructions to determine the one or more content containers for the visual content comprise instructions that direct the processing system to identify an existing content container in the visual content.

7. The system of claim 1, wherein the program instructions to determine the one or more content containers for the visual content comprise instructions that direct the processing system to create a new content container.

8. The system of claim 1, wherein the program instructions to determine structured data associated with the visual content comprise instructions that direct the processing system to analyze a schema in the visual content.

9. The system of claim 1, wherein the program instructions to determine structured data associated with the visual content comprise instructions that direct the processing system to:
identify one or more probable schemas for the visual content by comparing the visual content to at least one content template of known content stored on the one or more computer readable storage media; and
request the one or more probable schemas from a schema provider.

10. The system of claim 1, wherein the program instructions to determine structured data associated with the visual content comprise instructions that direct the processing system to:
identify a source of the visual content from a source identifier; and
retrieve the structured data from the source of the visual content.

11. The system of claim 1, wherein the program instructions to determine structured data associated with the visual content comprise instructions that direct the processing system to:
identify a source identifier associated with the visual content; and
retrieve the structured data from an index service having a plurality of structured data indexed by the source identifier associated with the visual content.

12. The system of claim 1, wherein the program instructions to assign semantic notation representative of the structured data to the at least one of the one or more content containers comprise instructions that direct the processing system to:
append a non-visual identifier indicating the structured data type to a visual aspect of the at least one of the one or more content containers.

13. A method of facilitating structured data in a content store, the method comprising:
receiving, from a notebook application, an indication to store a visual content that is unstructured, the visual content comprising text, or images, or handwritten ink strokes, or a combination thereof;
determining one or more content containers for the visual content;
determining structured data associated with the visual content, wherein the structured data comprises entities identified from sources including a dictionary;
assigning semantic notation representative of the structured data to at least one of the one or more content containers, wherein the semantic notation indicates a structured data type for a corresponding entity identified in the structured data, wherein the semantic notation is separate from an information aspect and a formatting aspect of the visual content;
storing the visual content and the at least one of the one or more content containers with the semantic notation in the content store;
receiving, from a first content application, a modification to a particular visual content having an associated semantic notation, the modification comprising an edit to an arbitrary location, the semantic notation remaining on an associated content container regardless of the modification to the particular visual content;
in response to receiving, from a second application, a request for the particular visual content, querying the content store for the particular visual content; and
providing, to the content application, the particular visual content having the modification and the semantic notation associated therewith.

14. The method of claim 13, wherein determining one or more content containers for the visual content comprises one or more of creating a new content container and identifying an existing content container in the visual content.

15. The method of claim 13, wherein determining structured data comprises:
identifying one or more probable schemas for the visual content by comparing the visual content to at least one content template of known content; and
requesting the probable schemas from a schema provider.

16. The method of claim 13, wherein assigning semantic notation representative of the structured data to the at least one of the one or more content containers comprises:
appending a non-visual identifier indicating a structured data type to a visual aspect of the at least one of the one or more content containers.

17. The method of claim 13, wherein the edit to the arbitrary location is a formatting edit.

* * * * *